Patented June 24, 1947

2,422,893

UNITED STATES PATENT OFFICE 2,422,893

COCONUT METHOD

Jesse Clayton Forkner and John Hood Forkner, Fresno, Calif.

No Drawing. Application April 11, 1944, Serial No. 530,562

8 Claims. (Cl. 99—125)

This invention relates generally to a method for the manufacture of an improved coconut product, and particularly to a method for mechanically removing skins from coconut to form an essentially skin free coconut product. The invention further relates to a coconut product having improved properties distinguishing it from common desiccated coconut.

The most common procedure to remove the skins from coconuts is to pare the skin from the fresh meat by hand. Such operations must be carried out close to the growing area in order to make it feasible to transport the fresh coconut to the paring plant, and to do this before the coconut spoils. The amount of hand labor required limits this method to areas where there is an abundance of cheap and dependable labor. A second method which has been used to a much lesser extent is to mechanically remove the skin from the fresh nut by buffing, grinding or slicing. While this method eliminates some of the hand labor, it must likewise be carried out at points close enough to the growing area to profitably transport the fresh nut. The importance of the transportation factor and handling of the fresh nuts may be appreciated by noting that a fresh nut has not more than about 30% saleable coconut meat. Buffing, grinding or slicing machines are limited as to capacity, due to the off sized and broken variety of shapes, and therefore for a given capacity a large number of such machines may be required, resulting in an un-economical investment. In many instances it would be necessary to locate this investment in foreign areas, which might not be considered desirable or safe from a business risk standpoint. Because of the foregoing considerations, and for other reasons not mentioned, such machine operations have not proven as satisfactory as hand paring.

As is evident from the above both hand paring and the machine operations as practiced in the past involve limitations with respect to time, and transportation and other costs for handling the fresh unspoiled nuts, which from an economical standpoint necessarily limits the quantity of fresh material which may be collected at a given point for carrying out processing operations, so that it is difficult if not impossible to develop low costs through volume operations. Where the more accepted of hand paring is employed, it is impractical to remove the skins from the dried material (i. e. copra) because this is relatively hard and is not amenable to hand paring.

It is an object of the present invention to provide a method which will effectively remove the skin from dried coconut meat without the customary hand operations, and without being limited with respect to the geographical area of available fresh nuts where the method is carried out.

A further object of the method is to provide a method of the above character which can be carried out economically with machinery having a comparatively high capacity and a low unit production cost, predicated upon volume of operation.

A particular feature of the present process is that in place of endeavoring to remove skins from fresh meat, the skins are removed after the meat has been dried and after the meat may have been transported from the growing area to points close to marketing areas, and where large quantities may be assembled. The method has been made possible by our discovery that when a substantial amount of oil and moisture is removed from coconut meat containing skins, it is possible to effectively remove the skins by a simple operation employing application of separating forces. It appears that the oil removal causes a substantial change in relative classifying or separating characteristics between the skins and the associated meat particles.

In carrying out our method the coconut meat at the growing area is husked, shelled and then dried by conventional methods, such as sun drying, kiln drying, or smoke drying. The dried fragments resulting from this operation is common copra, and the moisture content is generally less than about 7%. For our purposes it is desirable that the handling and drying be carried out in such a manner as to keep the material as clean and light colored as possible. In instances where the remainder of the process for removing skins closely follows drying, considerably more moisture may remain, as for example as much as 20%. However where an appreciable time lapse is to occur before the skin is removed, as will generally be the case, a considerably lower moisture content should be obtained in order to prevent spoilage, as for example of the order of 4%. The oil content of this material will be in the neighborhood of about 68%, which is the usual oil content of copra. It will be evident that the starting material may be copra, in place of the fresh coconut, although it is preferable to select a superior grade and color suitable for human consumption. As will be presently explained it is possible to carry out washing and bleaching operations to improve the quality of the finished product, and thus compensate for lack of cleanliness and discoloration of the original copra, or to offset discoloration during processing where an expeller is employed for oil removal.

At a location to which the dried coconut may be transported the material is first ground by known methods to a suitable fineness to enable removal of the oil content, as for example to a fineness of about 10 mesh. As will be presently explained this grinding may be followed by further grinding or milling after oil removal, for the purpose of conditioning the material for more efficient separation of the skins.

Following grinding the material is treated for the removal of a substantial part of its oil content. Any one of several known procedures can be used for this purpose. The most common procedure is to employ a mechanical expeller of the Anderson type. Another procedure is to subject cakes of the material to relatively high pressure in a suitable press, such as one of the hydraulic type. Procedures used to a lesser extent involve boiling or heating the material to an elevated temperature, whereby a substantial amount of oil will flow out from the meal, and extraction of oil by use of solvents. Of these four procedures we prefer to employ presses of the hydraulic type. Where an expeller is employed the meal is discolored, and the meal is compressed in such a manner as to hinder separation of the skins. Therefore as will be presently explained, in this instance we treat the meal from the expeller in a particular way to re-aerate and expand the particles, and to lighten the color.

The method is not critical with respect to the amount of oil removed. Thus as much as about 20% of the oil may remain, or substantially all of the oil can be removed. However in general good results are secured by removing an amount of oil so that the material has a remaining oil content of about 10%.

After the removal of oil it is desirable to subject the material to further grinding or milling to prepare it for the separating operation. This operation can be carried out by passing the material through a mill or grinder of the hammer type, which subjects the material to grinding and repeating impacts to effectively break away or loosen the fragments of skin from associated particles of coconut meat. It is not essential to carry out this second grinding operation, particularly where the first grinding is made sufficiently fine, although it is desirable for the purpose of loosening skins from the particles of meat, and to thereby promote the efficiency of the subsequent separating operation. The fineness of the meal at this point will depend upon the character and extent of grinding, and in a typical instance can be to about 15 mesh.

The meal produced as described above is then subjected to a separating operation as by feeding it to any conventional form of shaker table. The equipment known as a rice separator is suitable for this purpose. Because of the oil removal and grinding the meal at this point is characterized by a marked difference in separating characteristics between the coconut meat and the skins, and in addition the meat is in dry fluffy form which permits the skins to shake through to the bottom of the table. Simultaneously with removal of skins any dirt or other foreign matter which may be present is likewise removed.

The use of a shaker table as described above is deemed desirable, although other types of separating equipment can be employed for applying separating forces, as for example separators employing whirling or cyclonic currents of gas and which carry the material in suspension, or centrifuges of the type adapted to handle such dry material.

A specific example of the above method can be outlined as follows: One hundred pounds of clean sun-dried coconut which contains about 4% moisture, 28% coconut fiber, and 68% oil, is ground to about 15 mesh, and then warmed to a temperature of the order of 130° F. to free the oil and make it flow easily. This coconut meat is then passed through a set of rolls in order to free the oil and break down the fiber to aid in subsequent pressing. The material is then formed into suitable sized press cakes and these cakes are wrapped in suitable press cloths and placed in a hydraulic press. In the press the material is gradually subjected to an ultimate pressure of about 2000 pounds per square inch, and held at that pressure until the oil substantially ceases to flow.

The cake upon removal from the hydraulic press has an oil content of about 15%, and this material is then reground in a hammer mill employing the same size screen as in the preliminary grinding. The ground meal is then supplied to a shaker table of the rice separator type, and subjected to separation and agitation. In a typical instance about two pounds of skin, dirt, and other foreign material is removed, leaving about 30 pounds of meal essentially free of skins, and suitable for human consumption.

As will be presently pointed out the product at this point is usable, although we may desire to subject it to further treatment to afford special properties of particular interest to the baking industry. This 30 pounds of meal is then placed in a dough mixer which is preferably provided with heating means such as a steam jacket. Here the meal is mixed to provide aeration and at the same time it is heated to an elevated temperature of the order of a 130° F. To this material there is added about 15 pounds of a syrup, consisting of two parts invert sugar and one part water. This syrup is likewise at a temperature of 130° F., and is thoroughly intermixed with and absorbed by the meal. About 15 pounds of the coconut oil which has been removed during the course of the process, and which has been filtered and deodorized, is then added to the meal and thoroughly intermixed and absorbed. A time lapse of several hours should be provided for the meal to homogeneously absorb the oil and to cool to atmospheric temperature. A suitable quantity of a wax, such as about 5 pounds of liquid warm beeswax, is then added to the meal and the meal again intermixed so that the beeswax is spread upon the surfaces of the particles of meat, with the result that the films of wax tend to inhibit evaporation of moisture, thus affording a final product which is relatively stabilized with respect to its moisture content.

Where the method is carried out by use of an expeller for removing oil, or where the meal is discolored because of the use of dirty or discolored copra, it is preferable to utilize a hydraulic separating method in place of separation applied upon the dry material. Assuming that the meal is discolored because of the grade of copra used, and where the oil has been removed by pressing or extraction in such a manner as should not cause discoloration, hydraulic separation can be directly applied to the meal by conventional apparatus such as hydraulic classifiers, centrifuges, or concentrating tables of the Wilfley type. The skin particles are distinctly heavier than the aerated particles of fiber, and immediately sink to the bottom when suspended in water.

Where the oil has been removed by use of an expeller of the Anderson type, there appears to be less difference in separating characteristics, and when the meal is suspended in water both skins and fiber sink. A difference in clarifying characteristics exists, but not to a sufficient degree to permit application of simple inexpensive hydraulic separating procedures. It is probable that this is because of the relatively high pressures developed in the expeller which cause a mechanical bond between the skin particles and fiber, and which removes intrapped air from the fiber.

We have found that expeller meal can be made amenable to hydraulic separation by chemical treatment which causes a change in form to thereby create a substantial difference in separating characteristics between the skin and the fiber. For example good results can be secured by intermixing the expeller meal with a solution comprising 100 parts of water, to one part of caustic soda. Thereafter the caustic solution is withdrawn from the meal, as by decantation and filtering, and is pressed and then washed with fresh water. Other caustics can be employed, or mineral acids like sulphuric acid can be used.

After removal of the meal from the caustic solution, it is treated in a solution containing a bleaching agent, such as chlorine. It has been found that this treatment not only serves to lighten the color of the final product, but it also makes the fiber fluffy and provides a certain degree of aeration. Furthermore the chlorine neutralizes and removes all remaining traces of caustic. After the bleaching treatment, the meal is removed from the chlorine solution as by means of decantation and filtering, followed thorough washing, and then the meal is subjected to hydraulic separation as has been previously described. Because of the special chemical treatment the meal is now amenable to effective hydraulic separation, and assuming the use of ordinary settling tanks, the skins quickly settle to the bottom for removal as an underflow, while the coconut fiber or meat can be removed as an overflow.

One type of apparatus which has been used with good results for carrying out a hydraulic separating operation, consists of a circularly contoured tank having a lower cone symmetrical with the vertical axis of the tank. A slurry of water and meal is introduced into the tank and caused to swirl about the vertical axis to form a vortex. The heavier skins progress to the bottom of the cone where they can be removed by means of a suitable pump. The coconut meat is withdrawn through an overflow launder. The slurry fed to such equipment can consist of 20 parts water to one part meal.

Assuming that it is desired to further process meal produced by hydraulic separation, as distinguished from separation in the dry state, the meal is removed from the bulk of the water by known procedures such as settling, decantation, and filtration, and the meal then dried to produce a material of definite water content. Then this product can be further treated in the manners previously described.

Irrespective of whether separation is carried out with material in drying condition, or hydraulically, followed by drying, the material produced at this point is a skin free product. Because of the reduced oil content it has relatively high absorptivity for both water and oil, and it is a fluffy aerated material having only a small residule skin content. Assuming that one desired to incorporate oil into this material, it is evident that any portion of the coconut oil derived from the process, can be reused in this fashion. In place of using coconut oil for this purpose it is possible to incorporate other edible oil, such as cotton seed oil, which is similar to coconut oil in color and taste.

A practical skin free product is likewise formed when the dry meal after the separating operation is simply treated to incorporate in it a desired amount of oil without incorporating water, wax, or invert sugar. When oil alone is added in this fashion, the meal is comparable to desiccated coconut meal, such as is now commercially available. The product formed by the procedure previously described, involving incorporation of water, invert sugar, oil, and wax is particularly desirable in the baking industry for use in various bakery products. In ordinary fresh coconut meat the oil content holds the paramount position in the cellular mass, and the water content surrounds the oil, and occupies a secondary position where it is readily subject to evaporation. In the procedure previously described for incorporating both water and oil, the water is incorporated first, so that it acquires the preferred inner position, and this absorbed water is then surrounded and protected against ready evaporation by the oil.

In place of first incorporating water and then oil, it is possible to provide an emulsion of oil with water, making use of known emulsifying agents, and then intermixing this emulsion with the meal. In this instance the cell structure of the meal tends to absorb both the oil and the water and the water is caused to occupy a more preferred position than normally, thus leaving the oil content to occupy an outer position where it will tend to minimize evaporation.

With respect to use of a coating wax as previously described, this step likewise can be omitted if desired. In addition to beeswax, materials such as carnauba or wax can be used, or in general any wax which is completely edible and which does not detrimentally affect the color, flavor or palatability of the product. As previously explained the use of such a wax likewise tends to prevent evaporation of moisture, and thus a wax treated product is particularly desirable for baking and for confection uses, where it is desirable to prevent rapid loss of moisture during and after cooking or baking.

In the specific example of our method previously set forth, reference was made to incorporating invert sugar syrup into the product, before incorporation of oil. Invert sugar is an agent serving to retain moisture by virtue of its hygroscopicity, and thus tends to produce a product which is relatively stable with respect to its moisture content. It will be evident that this agent can be omitted if desired, where the added moisture stability which it affords is not necessary or desired for the purposes for which the product is to be used. In place of invert sugar other agents tending to retain moisture by virtue of their hygroscopicity can be employed, as for example glycerine, propylene glycol or fruit syrups.

Previous reference has been made to procedures involving washing the comminuted coconut meat with water, following its chemical treatment. It has been found that this washing removes a substantial percentage of solubles and extremely fine substance or "fines," and as a result the finished material tends to be rough and relatively unpalatable. Where such procedures are followed we prefer, in order to avoid this difficulty, to incorporate an ingredient or ingredients which are completely edible and which compensates for the loss of such solubles and fines. Suitable ingredients for this purpose are the flours of various grains like wheat, rice, etc., and beet or cane sugars. We prefer to introduce such ingredients prior to drying of the material, whereby they are effectively bonded to the final dried particles of coconut meat.

As an example of the foregoing procedure we wash 100 pounds of coconut expeller meal with water, and treat it with caustic soda, followed by treatment with a bleaching agent like chlorine, as previously described. Water is pressed from the resulting material until it consists of say about 60% water, and 40% coconut meat. To this moist material we add 40 pounds of wheat flour, which is approximately the weight of the coconut meat present, on a dry basis. In place of 40 pounds of wheat flour, we may use 20 pounds of wheat flour with 20 pounds of sugar, or 40 pounds of sugar can be used without flour. After addition of such ingredients the entire mass is mixed for about 10 minutes in a common dough mixer, and then it is dried as by means of a common tunnel drier. The final dried material is then passed through a suitable mill, such as one of the hammer type, to completely divide the particles. The final product is relatively palatable, and the added material present does not tend to separate out.

Our invention should not be confused with present day practice of removing oil from copra or coconut. At the present time this is simply for the purpose of producing a usable coconut oil, and the by-product meal produced contains both the skin and meat content, and is not used for human consumption.

It will be evident that our method makes it possible to produce products comparable to present forms of desiccated coconut, and the method also makes possible reclaiming and making available for human consumption much copra meat which would otherwise be unfit for human food. Products can be produced which are particularly desirable in the baking industry, as for instance Forkner Patent No. 2,272,989. The process is of great value to the coconut industry particularly in that it facilitates production of high quality coconut products at lower cost.

We claim:

1. In a method for manufacturing a skin free coconut product, the steps of grinding dried coconut with the skins, removing oil from the resulting material, and then removing skins by subjecting the material to separating forces.

2. A method for manufacturing a skin free coconut product as in claim 1 in which the material is in dry divided condition at the time the separating forces are applied.

3. A method for manufacturing a skin free coconut product as in claim 1 in which the material is subjected to hydraulic separation for the removal of skins.

4. In a method for manufacture of a skin free coconut product, the steps of grinding dried coconut with the skins to suitable size to facilitate oil removal, removing oil from the material, subjecting the material to further grinding, and then removing skins from the material by subjecting the same to separating forces.

5. In a method for manufacture of a skin free coconut product, the steps of grinding dried coconut with the skins to suitable size to facilitate oil removal, removing oil from the material to reduce its oil content, removing skins by subjecting the material to separating forces, and then reintroducing oil back into the material.

6. In a method for manufacturing a skin free coconut product, the steps of grinding dried coconut with the skins, removing oil from the resulting material, subjecting the material to a solution of a bleaching agent in water, and then subjecting the material to hydraulic separation for the removal of skins.

7. In a method for manufacturing a skin free coconut product, the steps of grinding dried coconut with the skins, expelling oil from the resulting material, treating the resulting material with a caustic solution, then treating the material with a bleaching agent, and thereafter subjecting the material to separating forces for the removal of skins.

8. In a method for manufacturing a skin free coconut product, the steps of grinding dried coconut with the skins, removing oil from the resulting material, removing skins by subjecting the material to separating forces, mixing the resulting skin free fiber with a sugar syrup and with coconut oil, and then mixing the material with melted wax to film over the particles.

JESSE CLAYTON FORKNER.
JOHN HOOD FORKNER.

REFERENCES CITED

The following references are of record in the file of this patent:

UNITED STATES PATENTS

| Number | Name | Date |
| --- | --- | --- |
| 1,280,634 | Barab | Oct. 8, 1918 |
| 220,359 | Dunham | Oct. 7, 1879 |
| 2,269,015 | Forkner | Jan. 6, 1942 |
| 2,079,030 | Northcutt | May 4, 1937 |